United States Patent [19]
Cronstedt et al.

[11] 3,874,824
[45] Apr. 1, 1975

[54] TURBOMACHINE ROTOR ASSEMBLY

[75] Inventors: Val Cronstedt, Williamsport, Pa.;
Wayne C. Shank, Tucson, Ariz.

[73] Assignee: Avco Corporation, Williamsport, Pa.

[22] Filed: Oct. 1, 1973

[21] Appl. No.: 401,969

[52] U.S. Cl. .................. 417/406, 403/47, 403/296, 403/359
[51] Int. Cl. ............................................. F04b 17/00
[58] Field of Search ............ 417/405, 406; 403/296, 403/359, 47

[56] References Cited
UNITED STATES PATENTS

| | | | |
|---|---|---|---|
| 2,485,280 | 10/1949 | Grace | 403/47 |
| 2,547,789 | 4/1951 | Skeel | 403/47 |
| 2,780,174 | 2/1957 | Wosika et al. | 417/406 |
| 3,102,490 | 9/1963 | Shiley | 417/406 |
| 3,632,222 | 1/1972 | Cronstedt | 415/122 |
| 3,692,436 | 9/1972 | Connor et al. | 417/406 |

FOREIGN PATENTS OR APPLICATIONS

| | | | |
|---|---|---|---|
| 423,490 | 4/1967 | Switzerland | 417/406 |
| 1,902,704 | 8/1970 | Germany | 417/406 |

*Primary Examiner*—C. J. Husar
*Attorney, Agent, or Firm*—Charles M. Hogan; Gary M. Gron; Irwin P. Garfinkle

[57] ABSTRACT

A centrifugal compressor and centripetal turbine are interconnected by a central bolt engaging threaded portions in each of the components. The threaded portions have a different pitch so that the rotation of the bolt in a given direction relative to the compressor and turbine pulls them into tight axial engagement with one another. The differential bolt has a necked-down central portion which forms an annular flow path for seal pressurization fluid from one side of the compressor to the other. A locking element that is splined to the compressor is used to keep the differential bolt from loosening once the compressor and turbine have been tightened to the proper degree.

9 Claims, 3 Drawing Figures

Fig 1

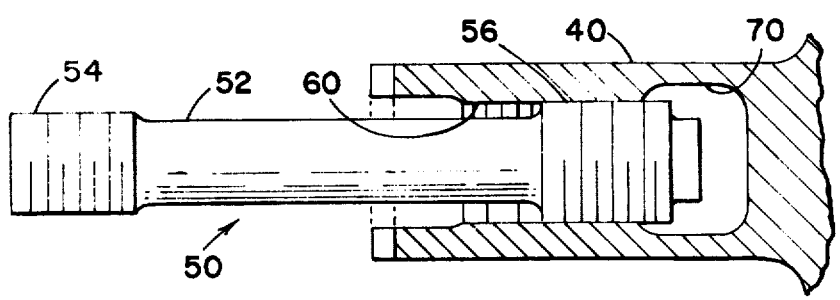
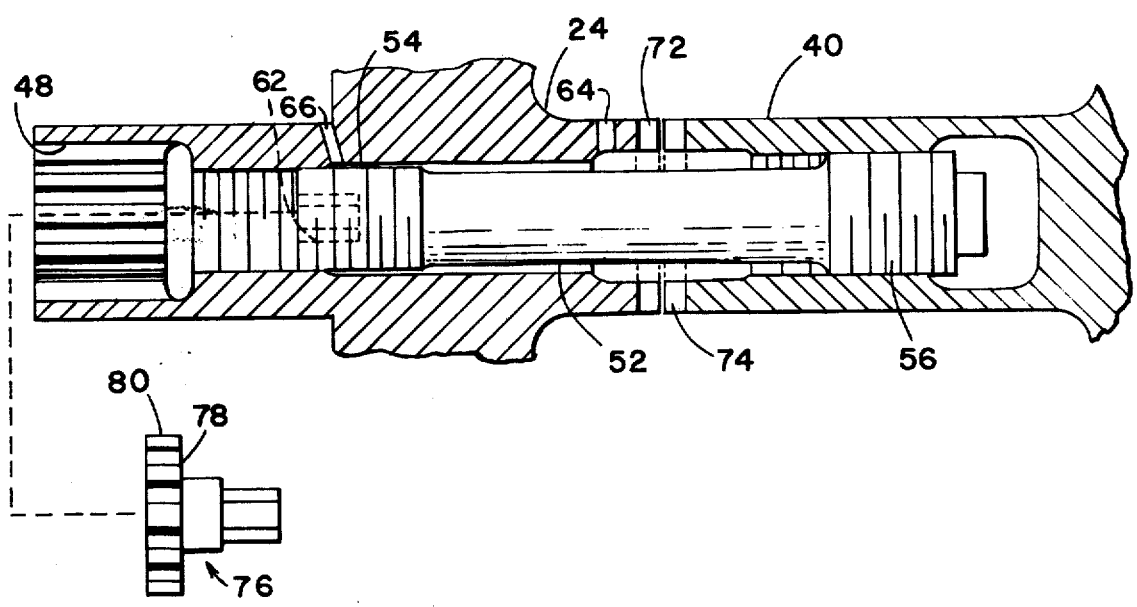

TURBOMACHINE ROTOR ASSEMBLY

The present invention relates to turbomachines and more specifically to turbomachine rotor assemblies.

In the gas turbine art it is a common practice to make compressor and turbine components as separate units and then tie them together axially to form a turbomachine rotor assembly. For relatively small gas turbine engines that use centrifugal and centripetal components the common practice has been to tie the compressor and turbine together by means of a threaded connection. This may take the form of a threaded portion on a shaft that is integral with one of the components. The other component is then telescoped over this shaft and a nut applied to the threaded shaft to hold the components axially. In another form, one of the components may have a threaded bore and the other component is secured to the first component by means of an ordinary bolt assembly extending through a hold in the other component and received in the threaded bore.

In each of these cases, however, a particular problem arises. This is the fact that this connection does not enable the assembler to apply sufficient torque to tighten the components together axially with proper force, which in many cases must exceed 15,000 lbs.

These problems are solved by a turbomachine rotor assembly which comprises compressor and turbine assemblies each having central tubular shafts having abutting end faces. A bolt is received in the interior of the compressor and turbine shafts and has first and second threaded portions engaging corresponding threaded portions on the interior of the shafts. The threads are both of the same hand. The number of threads per unit length (pitch) on the first set are different from that for the second. As a result, when the bolt is turned in a given direction relative to the compressor and turbine assemblies the end faces of the shaft are drawn into tight axial abutment.

The above and other related features of the present invention will be apparent from a reading of the following description of the disclosure shown in the accompanying drawings and the novelty thereof pointed out in the appended claims.

In the drawings:

FIG. 1 is a longitudinal section view of a gas turbine engine which has a turbomachine rotor assembly embodying the present invention;

FIG. 2 is an enlarged fragmentary longitudinal section view showing a portion of the turbomachine rotor assembly of FIG. 1 in a preliminary stage of assembly; and FIG. 3 is an enlarged fragmentary longitudinal view of the turbomachine rotor assembly of FIG. 1 shown in an intermediate state of assembly.

Figure 1:
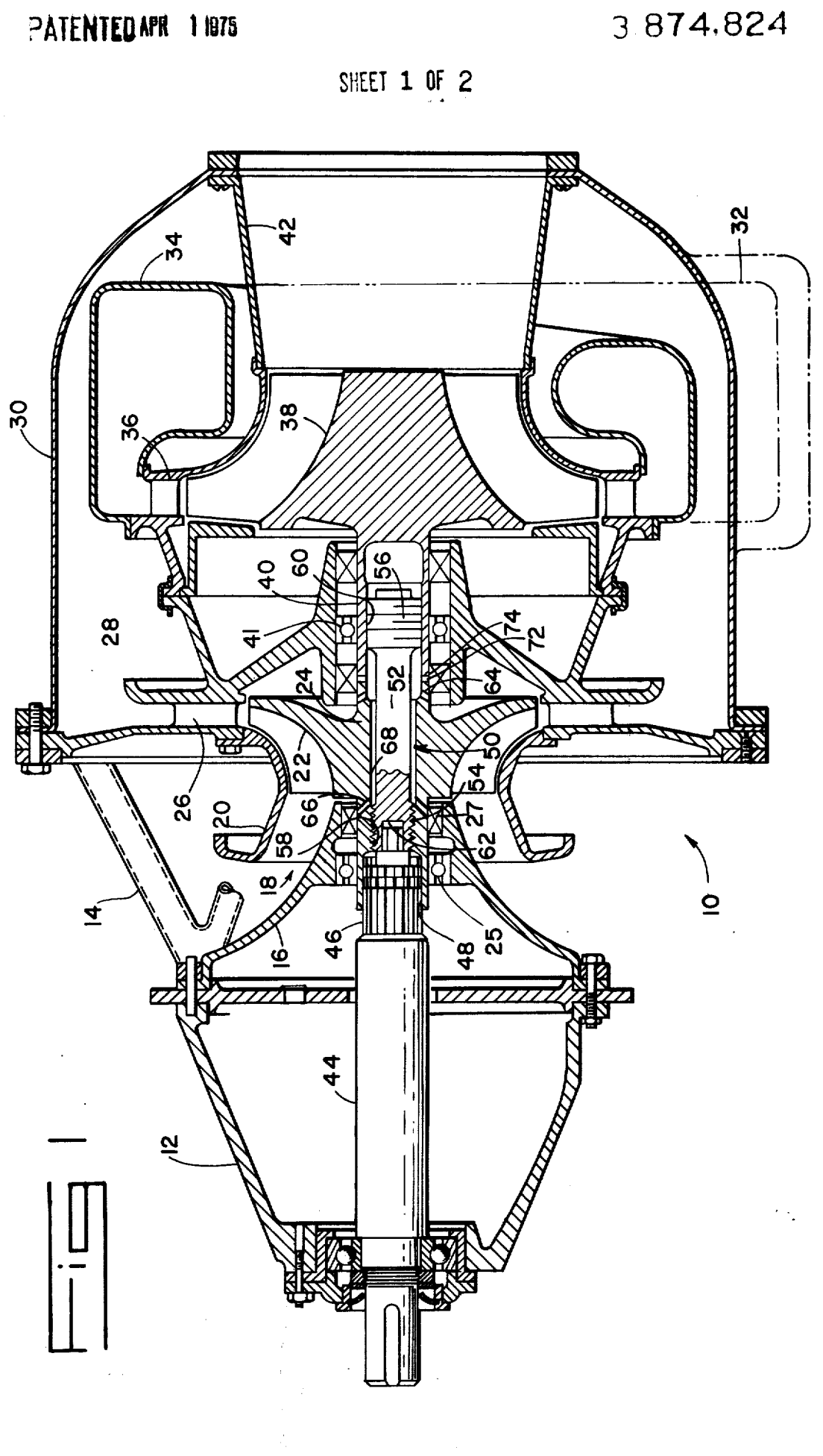

FIG. 1 shows a gas turbine engine 10 which comprises a forward gearbox housing 12 mounting at its aft end a series of V struts 14 and a bellmouth 16 forming an air inlet 18 in combination with another bellmouth 20. Air from the inlet is pressurized by a bladed centrifugal impeller 22 supported on an integral tubular shaft 24 and discharged through a diffuser assembly 26 that is structurally secured to the aft end of the struts 14. Air from the diffuser 26 passes into a chamber 28 defined by an outer housing 30. A combustor 32 (shown in phantom) is perforated to receive the pressurized air and has a suitable arrangement for injecting metered fuel to be mixed with the air. The resultant mixture is ignited to produce a hot gas stream which sustains further combustion and which is discharged through a turbine inlet duct 34. From there the gas stream passes through a turbine nozzle assembly 36 (structurally connected to diffuser 26) and across a bladed centripetal turbine wheel 38. Turbine wheel 38 is supported by an integral shaft 40. A conical exhaust duct 42 provides an outlet for the hot gas stream to the atmosphere.

Passage of the gas across the turbine wheel 38 causes it to rotate and produce a torque output used to drive the compressor 22, which is connected to it, through axial face splines 72, 74 and to drive an output shaft 44 connected to the compressor 22 by splines 46 which engage splines 48 in the open forward end of the tubular shaft 24. Since the turbomachine components rotate at extremely high speeds, a speed-reduction gear set would normally be included in the gearbox 12 to bring the output speed to a manageable level. In the interest of simplifying the description of the invention, however, the gear set has been eliminated and replaced by the single output shaft 44. It should be apparent to those skilled in the art that a reduction gearbox can be incorporated in the engine if necessary.

The turbine shaft 40 is journaled for rotation by a bearing assembly 41 and the compressor shaft 24 is journaled by a bearing assembly 25 secured to housing 16. The chamber in which bearing assembly 25 is mounted is sealed from the engine inlet 18 by a seal assembly schematically illustrated at 27.

The compressor and turbine 22 and 38 are held axially in accordance with the present invention by a differential bolt stage indicated at 50. This bolt assembly comprises a central necked-down portion 52 having a forward externally threaded portion 54 and an aft threaded portion 56, both shown in schematic fashion. Threaded portion 54 on differential bolt 50 engages internal threads 58 on the interior of tubular shaft 24. Threads 56 engage internal threads 60 on the interior of the turbine tubular shaft 40. The forward end of differential bolt 50 has a female socket 62, herein shown as a six-point socket, that can receive a suitable male socket for rotation of the bolt 50.

A series of radial ports 64 are provided through the shaft 24 aft of the compressor impeller 22. A second series of ports 66 extend through shaft 24 forward of the wheel 22 to connect the seal assembly 27 with an annular space 68 defined by the necked-down portion 62 of bolt 50 and the interior of shaft 24.

Initial assembly of the turbomachine rotor takes place as follows, with particular reference to FIGS. 2 and 3. The bolt assembly 50 has a difference in pitch between threaded portions 54 and 56, although they are both of the same hand. The particular choice of which of the threads will have the greater pitch is dependent upon the particular manner in which the bolt would be threaded into the components. However, the assembly illustrated has a greater pitch for threads 54 than for threads 56. A typical example would be threads 56 having twenty-four threads per inch and threads 54 having eighteen threads per inch.

To begin assembly the differential bolt 50 is threaded all the way into the tubular shaft 40 so that its end is adjacent the aft end of an access chamber 70 in shaft 40, as shown in FIG. 2. With the differential bolt 50 stationary relative to the shaft 40, the compressor shaft 24 is threaded onto threads 54 at the forward end of differential bolt 50. The compressor shaft 24 is rotated to advance it relative to the bolt 50 so that axial face splines 72 on its aft face are just adjacent axial face splines 74 on the forward face of shaft 40, as shown in FIG. 3. At this point compressor shaft 24 and turbine shaft 40 are restrained from rotating relative to one another and the differential bolt rotated to back it out of both the compressor shaft 24 and turbine shaft 40. Since there are a fewer number of threads per inch on threads 54 than for threads 56, a given rotation of the bolt 50 will cause greater relative axial motion betwen the compressor shaft 24 and the bolt 50 than between the turbine shaft 40 and the bolt 50.

As a result, the end faces of the shafts 24 and 40 are drawn toward one another due to the relative motion of their threaded portions. The differential thread action increases the mechanical advantage of the bolt 50 and permits a very high axial holding force for a given torque applied to the bolt. The reason for this is that the net effect of the differential thread arrangement is equivalent to a single thread in the present example of 42 threads per inch, which would give an extremely high mechanical advantage but which would not be practical in an actual application.

Once the differential bolt 50 is in place its position is locked by a locking element 76, shown in FIG. 3. Locking element 76 has a male socket 78 which is received in the female socket 62 in the forward end of differential bolt 50. Locking element 76 also has a flange 78 with a series of external splines 80 that are received in the internal splines 48 in the forward end of the compressor shaft 24.

The locking element is simply inserted into the forward end of the shaft 24 so that its male socket 28 engages the female socket 62 on bolt 50 and its external splines 80 engage the internal splines 48 on the forward end of shaft 24. To obtain the maximum flexibility in the positioning of the locking element 76 in the greatest number of positions relative to shaft 24, the ratio between the number of splines 80 and the number of faces on the socket 78 is a prime number. That is to say, it is a number that cannot be reduced to a lower ratio. For example, if the socket 78 has six faces the number of teeth on spline 80 would be selected to be 23. This ratio cannot be reduced further and enables a large number of relative positions in which the locking element will be received in both the splines 48 and socket 62. With the locking element in place the output shaft 44 is inserted in the end of compressor shaft 24 to hold it in place.

During operation of the engine, pressurized air on the back face of the compressor hub 22 passes radially inward through ports 64 to annular space 68 and then forward through ports 66 to the seal assembly 27. This provides an adequate supply of pressurized air for the seal 25 to prevent leakage of lubricating fluid from the bearing area into the inlet flow path 18 of the engine. The differential bolt 50 serves the dual function of holding the shafts in tight axial engagement and defining a flow path for seal pressurization fluid. In other instances it may also be used to carry cooling air from the compressor to another location in the engine.

While a preferred embodiment of the present invention has been described, it should be apparent to those skilled in the art that it may be employed in different forms without departing from its spirit and scope. For example, one modification would be to telescope one of the shafts over the other so that the threaded portions on their interior are closely adjacent. In this way a differential bolt may be employed that has differential threaded elements closely adjacent one another.

Having thus described the invention, what is claimed as novel and desired to be secured by Letters Patent of the United States is:

1. A turbomachine rotor assembly comprising:
   a first bladed turbomachine component and a first central tubular shaft having an end face;
   a second bladed turbomachine component having a second central tubular shaft coaxial with said first shaft and having an end face, said end faces having complementary splines for circumferentially locking said shafts when said faces are abutting;
   a bolt received in the interior of said first and second shafts, said bolt having first and second threaded portions respectively engaging the first and second threaded portions on said first and second shafts, the number of threads per unit length on said first portion being different from that for the second threaded portion; and
   wrench receiving means on the axis of said bolt for receiving a rotatable wrench for turning said bolt, whereby when said bolt is turned in a given direction relative to said turbomachine components the end faces of said shafts are drawn into tight axial abutment and said components are circumferentially locked by said complementary splines.

2. A turbomachine rotor assembly comprising:
   a first bladed turbomachine component and a first central tubular shaft;
   a second bladed turbomachine component having a second central tubular shaft coaxial with said first shaft and having its end face abutting the end face of said first shaft;
   a bolt received in the interior of said first and second shafts, said bolt having first and second threaded portions respectively engaging the first and second threaded portions on said first and second shafts, the number of threads per unit length on said first portion being different from that for the second threaded portion;
   a tool receiving socket in said bolt, said socket permitting rotation of said bolt relative to said turbomachine components whereby when said bolt is turned in a given direction relative to said turbomachine components the end faces of said shafts are drawn into tight axial abutment; and
   a lock having a first portion received in said socket and a second portion rotatably locked relative to said compressor shaft.

3. A turbomachine rotor assembly as in claim 1 wherein said shafts have interfitting opposed splined end faces thereby preventing relative rotation of said shafts when they are in axial abutment.

4. A turbomachine rotor assembly as in claim 1 wherein said first turbomachine component is a compressor impeller and said second turbomachine component is a turbine wheel.

5. A turbomachine rotor assembly as in claim 4 wherein:
   said bolt is elongated and necked down in between said first and second threaded portions, said necked-down portion extending between the aft face and the forward face of said compressor impeller; and said compressor shaft has a first passageway connecting the aft face of said compressor to said necked-down portion and a second passage connecting said necked-down portion to a position upstream of said impeller.

6. A turbomachine rotor assembly as in claim 5 further comprising:
   means for rotatably journaling the compressor shaft forward of said compressor hub; and
   means for sealing said shaft relative to said journaling means, said sealing means being in line with said second passage whereby said sealing means is pressurized.

7. A turbomachine rotor assembly as in claim 2 wherein the difference in the number of threads per unit length between the first and second threaded portions is relatively small, thereby enabling said bolt to assert a substantial axial holding force on said shafts.

8. A turbomachine rotor assembly as in claim 1 wherein said locking element has a flange and a series of external splines integral with said portion, the interior of said compressor shaft having a plurality of splines receiving the external splines on said flange, thereby forming in combination said locking means.

9. A turbomachine rotor assembly as in claim 8 wherein the number of teeth on said external spline and the number of faces on said socket define a ratio which is a prime number.

* * * * *